United States Patent
Lo

(10) Patent No.: US 9,114,411 B2
(45) Date of Patent: Aug. 25, 2015

(54) DRIZZLE TYPE SPRAY APPARATUS

(71) Applicant: Shun-Nan Lo, Taichung (TW)

(72) Inventor: Shun-Nan Lo, Taichung (TW)

(73) Assignee: YUAN-MEI CORP., Taichung (TW)

( * ) Notice: Subject to any disclaimer, the term of this patent is extended or adjusted under 35 U.S.C. 154(b) by 299 days.

(21) Appl. No.: 13/694,358

(22) Filed: Nov. 26, 2012

(65) Prior Publication Data

US 2014/0145015 A1    May 29, 2014

(51) Int. Cl.

| B05B 1/32 | (2006.01) |
| B05B 3/02 | (2006.01) |
| B05B 3/06 | (2006.01) |
| B05B 3/04 | (2006.01) |
| B05B 15/06 | (2006.01) |
| B05B 1/12 | (2006.01) |
| B05B 1/30 | (2006.01) |
| A47L 15/42 | (2006.01) |
| A47L 15/23 | (2006.01) |
| A01G 25/02 | (2006.01) |
| A01G 25/00 | (2006.01) |
| A01M 7/00 | (2006.01) |
| B08B 9/093 | (2006.01) |

(52) U.S. Cl.
CPC ............... *B05B 3/025* (2013.01); *A01G 25/00* (2013.01); *A01G 25/02* (2013.01); *A01M 7/005* (2013.01); *A47L 15/23* (2013.01); *A47L 15/4282* (2013.01); *B05B 1/12* (2013.01); *B05B 1/3073* (2013.01); *B05B 3/02* (2013.01); *B05B 3/0445* (2013.01); *B05B 3/06* (2013.01); *B05B 15/061* (2013.01); *B05B 15/063* (2013.01); *B08B 9/0936* (2013.01)

(58) Field of Classification Search
CPC ............ B05B 3/06; B05B 3/02; B05B 3/025; B05B 3/0445; B05B 3/066; B05B 3/0495; B05B 1/12; B05B 1/3073; B05B 1/308; B05B 15/061; B05B 15/063; B05B 15/066; B05B 15/067; B08B 9/0936; A47L 15/23; A47L 15/4282; A47L 15/18; A01G 25/00; A01G 25/02; A01M 7/005; F16L 27/0861
USPC .............. 239/225.1, 227, 243, 245, 248, 251, 239/253, 275, 279, 456, 458
See application file for complete search history.

(56) References Cited

U.S. PATENT DOCUMENTS

| 3,042,318 | A | | 7/1962 | Chow et al. |
| 3,744,721 | A | * | 7/1973 | Baumstark, Jr. ............... 239/253 |
| 6,659,374 | B1 | * | 12/2003 | Chiera ........................ 239/587.2 |
| 2005/0145717 | A1 | | 7/2005 | Katz et al. |

FOREIGN PATENT DOCUMENTS

| CN | 201020227364.0 | 2/2011 |
| CN | 201120403694.5 | 8/2012 |

* cited by examiner

*Primary Examiner* — Steven J Ganey
(74) *Attorney, Agent, or Firm* — Raymond Y. Chan; David and Raymond Patent Firm

(57) ABSTRACT

Disclosed is a drizzle type spray apparatus, especially a wetting drizzle spray apparatus, that is configured to attach an adjustable member onto an erectable ground-based tube, the adjustable member is made of adjustable units having rotatable angles, and works to operatively make up a sprinkle head, so as to allow change in the spray direction of the sprinkle head.

12 Claims, 6 Drawing Sheets

DRIZZLE TYPE SPRAY APPARATUS

BACKGROUND OF THE INVENTION

1. Fields of the Invention

The present disclosure relates to an improvement of drizzle type spray apparatus, which is used in wetting apparatus for cooling purposes or wetting apparatus for horticultural purpose. More specifically, the present invention relate to a non-industrially oriented drizzle type spray apparatus, that is set out to create drizzle type spray from highly pressurized water.

2. Descriptions of Related Art

CN201751014 describes a nozzle assembly and spray wetting device, which involves a nozzle unit, provides a wetting spray device comprising a pump (3), a water suction pipe (1), a water outlet hose (5), a spray gun (6), and a water outlet hole of the water pump (3) is connected with one end of the water outlet hose (5), the other end of the water outlet hose (5) is connected with the tail part of the spray gun (6), the spray wetting device also comprises the nozzle assembly provided by the utility model and the liquid inlet of the mounting seat (8) of the nozzle assembly is connected with the head of the spray gun (6). The nozzle assembly and the spray wetting device provided by the utility model can realize multidirectional spray and is evenin spray.

The invention features a nozzle assembly which comprises a mounting seat (8) and a plurality of nozzle (12), wherein the mounting seat (8) is provided with a liquid inlet and a plurality of nozzle interfaces which are communicated with each other, the nozzles are correspondingly installed on the nozzle interfaces, the nozzles are positioned on the same plane and distributed at the equal angle.

With the above description, the wetting device requires multiple nozzles to obtain desirable drizzle type spray angle, and the nozzle is fixed in a predefined fashion and is not free to adjustably rotational.

SUMMARY OF THE INVENTION

Wherefore, it is an object of the present invention to provide a spray-angle-changing nozzle device, wherein the nozzle device can leverage on the built-in adjustable member to obtain a desirable drizzle type spray direction.

The present invention comprises a tube having an end adapted for connecting to a water source, the tube has a docketing seat and a tube body, the tube body is a standing, cylindrical structure featuring a radially spiral and upward structural composition. The tube has a first end opening and second end opening, wherein the first end opening is attached with a connection provided for directing water source into the tube body, and the second end opening is attached with a connecting member, wherein the attachment part operates to receive an adjustable member, the adjustable member comprises a first adjustable unit and a second adjustable unit, an end of the first adjustable unit is equipped with a threading portion and another end is equipped with a first shaft portion, the second adjustable unit is equipped with a first shaft receiving portion and a second shaft receiving portion.

The connecting member is a collective part where three passage means are shared in one single structure, which has a first receiving portion and a second receiving portion, the first receiving portion is connected by a supersonics-based means or is threadably connected to the second end opening of the tube, the second receiving portion has second shaft receiving portion which are mutually symmetrical to each other, each of the second shaft portion works to receive a second shaft portion and the first shaft portion of the first adjustable unit is inserted into the first shaft receiving portion of the second adjustable unit.

The sprinkle head is at last threadably connected to the threaded portion of the first adjustable member. It should be understood that an inventive feature of the present invention is, but not limited to, the adjustable spray direction of the sprinkle head mediated by the rotating angle of the adjustable member.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 2-1 is a close-up view showing the slotted plate and plug of the sprinkle head.

DETAILED DESCRIPTION OF THE PREFERRED EMBODIMENT

Figure 1:
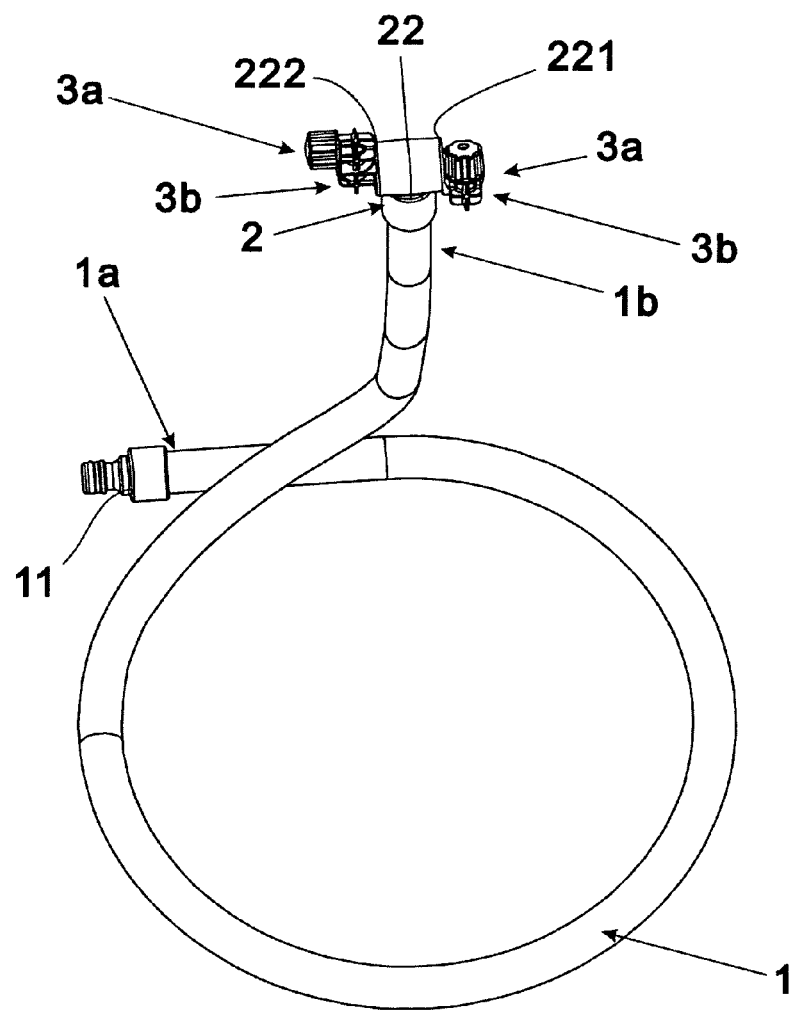
FIG. 1 is a three-dimensional perspective view of the drizzle type spray apparatus according to the present invention.
Figure 2:
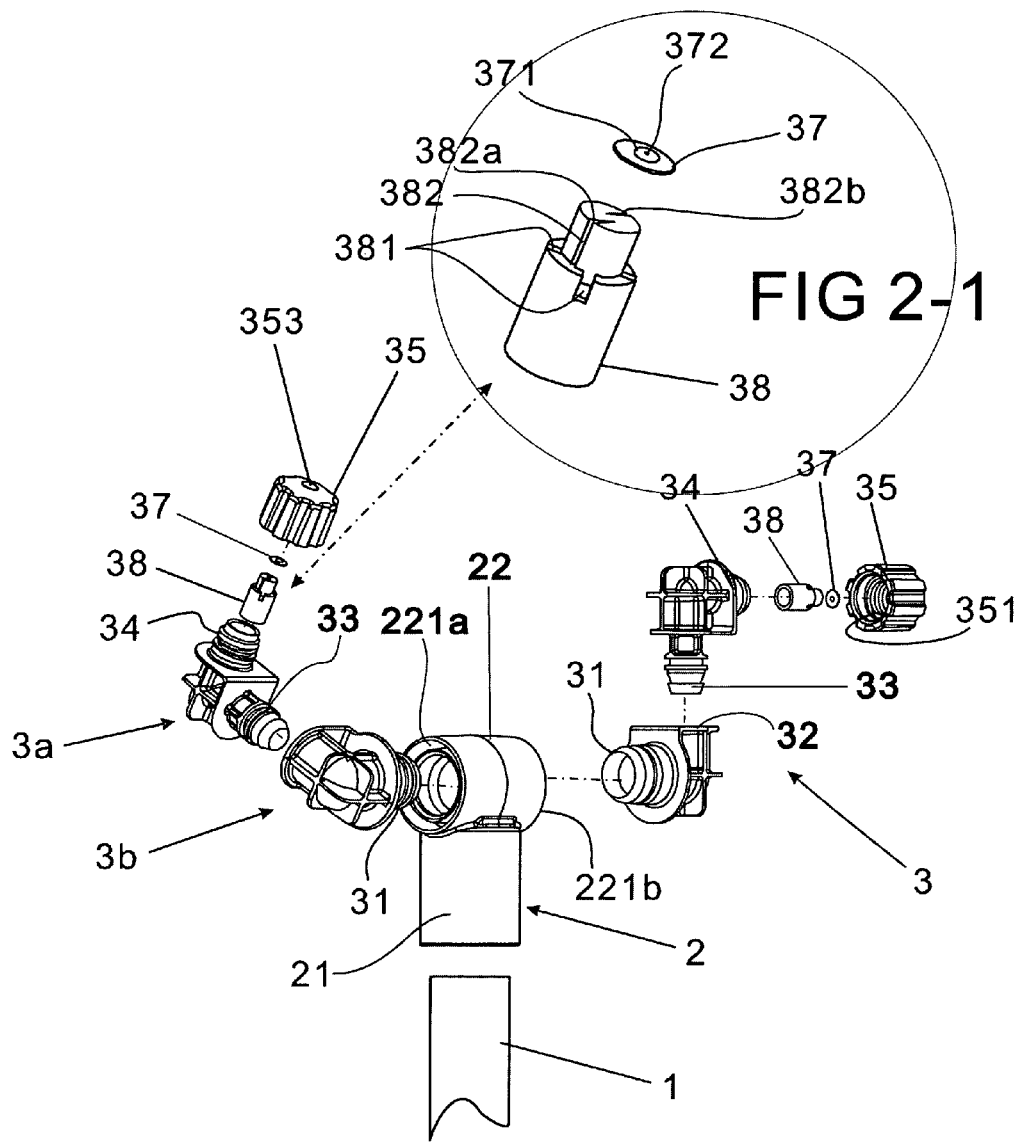
FIG. 2 is a three-dimensional schematic view of the drizzle type spray apparatus according to the present invention.
Figure 3:
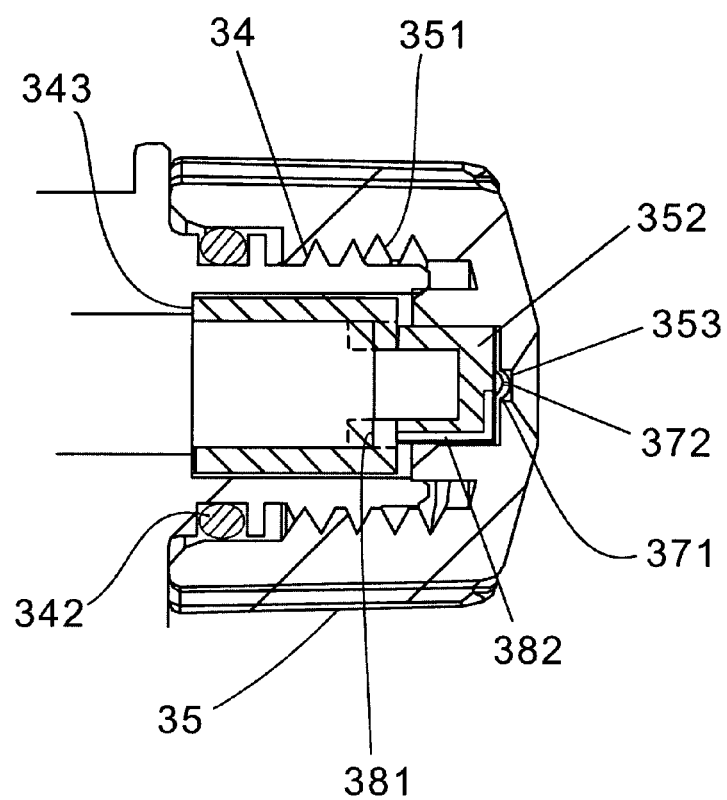
FIG. 3 is an exploded, sectional view of the sprinkle head.

Referring now to FIGS. 1, 2, 3, 4, there is a drizzle type spray apparatus provided for wetting purposes, which comprises: a tube 1, a connecting member 2, an adjustable member 3, a sprinkle head. The tube 1 has a first opening end 1*a* and a second opening end 1*b*, the first end opening 1*a* is attached to a connector 11, the second end opening 1*b* is attached to a connecting member 2, the connecting member 2 includes a generally cylindrical model, which is an erectable unibody first receiving portion 1*a* and second receiving portion 1*b*, the second receiving portion 22 has second shaft receiving portions 221*a*, 221*b* mutually symmetrical to each other, each of the second shaft receiving portions 221*a*, 221*b* is provided for receiving the second shaft portion 31 of the second adjustable unit;

The adjustable member 3 of an embodiment of the present invention is composed of 2 sets of adjustable units, each of which is a first adjustable unit 3*a* and a second adjustable unit 3*b*, where the first adjustable unit 3*a* is an angled tube, which has a first end and a second end, the first end has a threaded portion 34, the second end has a first shaft portion 33, an O-ring for sealing off fluid is disposed each on the threaded portion 34 and the first shaft portion 33, the O-ring 342 is designed to be respectively put around the threaded portion 34, and the first shaft portion 33, such that the O-ring 342 can assist in tightening the internal threading of the sprinkle head 35 to the secured with the threaded portion 34;

The second adjustable unit 3*b* is an angled tube, which has a first end and a second end, the first end is disposed with a first shaft receiving portion 32, the second end has a second shaft portion 31, the second shaft portion 31 is disposed with an O-ring 342 for sealing off fluid. The first shaft portion 33 of the first adjustable unit 3*a* is put around the first shaft receiving portion 32 of the second adjustable unit 3b, the second shaft portion 31 o the second adjustable unit 3b is put around the second shaft receiving portions 221a, 221b of the connecting member 2.

Figure 4:
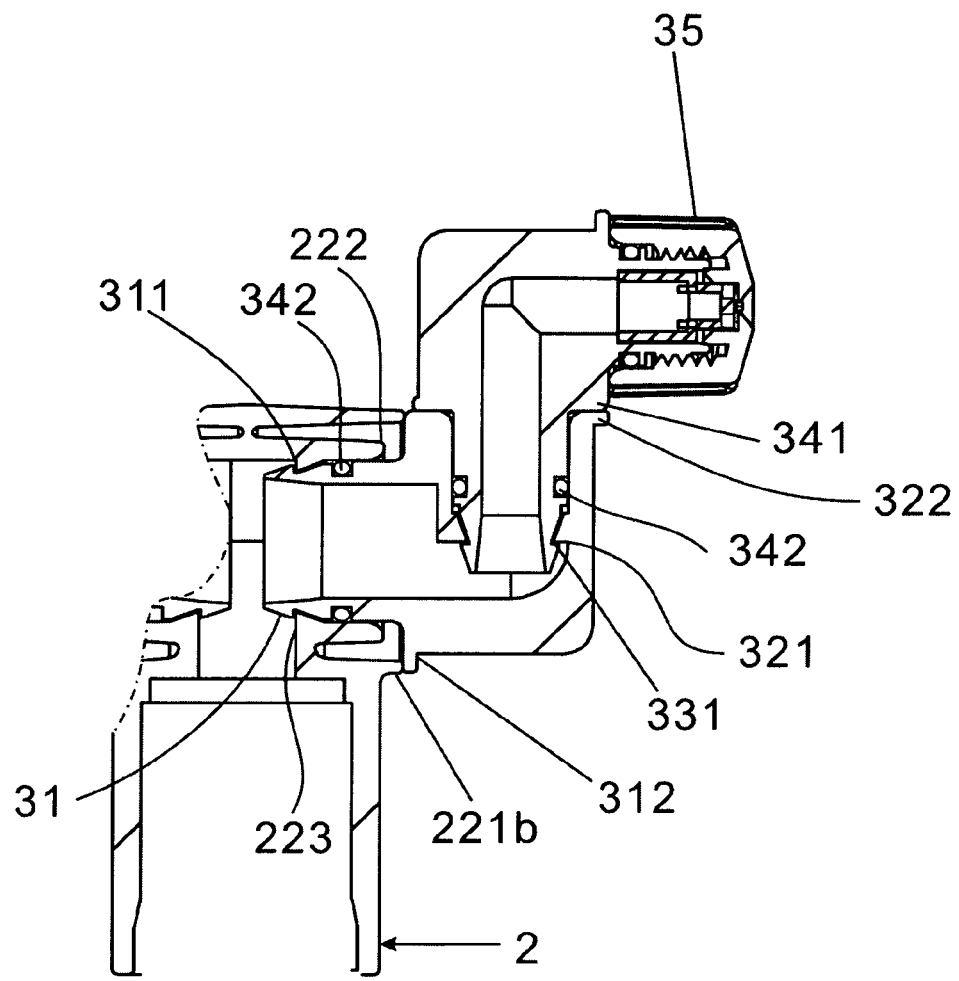
FIG. 4 is an exploded, sectional view of an adjustable member and sprinkle head according to the present invention.
Figure 5:
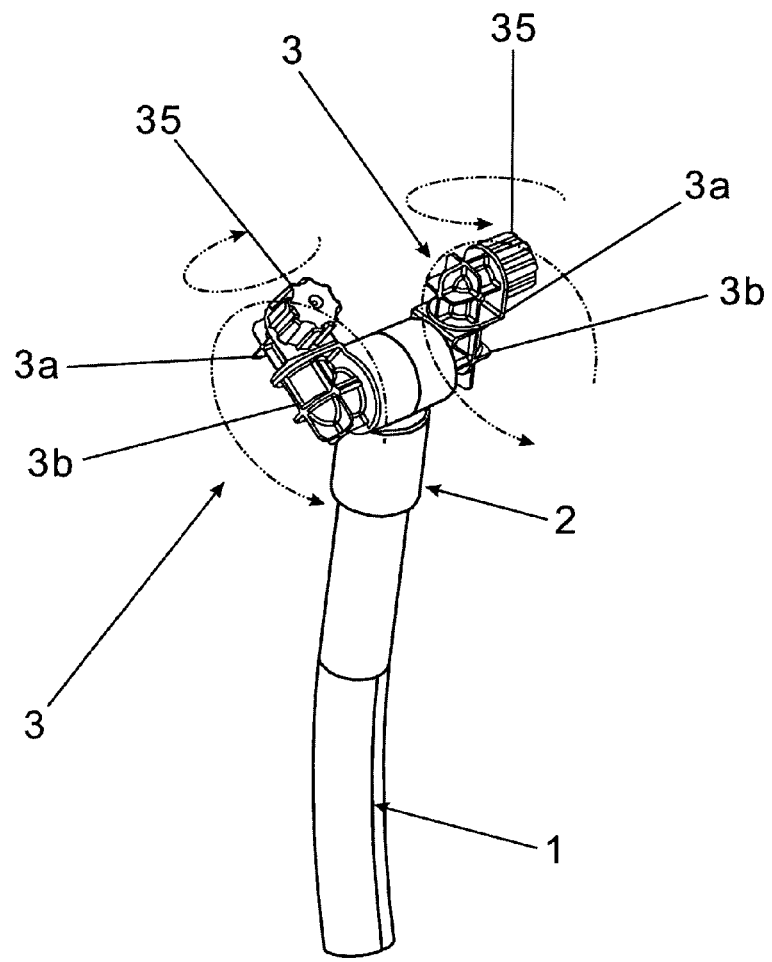
FIG. 5 is a diagram demonstrating the drizzle type spray apparatus of the present invention during its operation.
Figure 6:
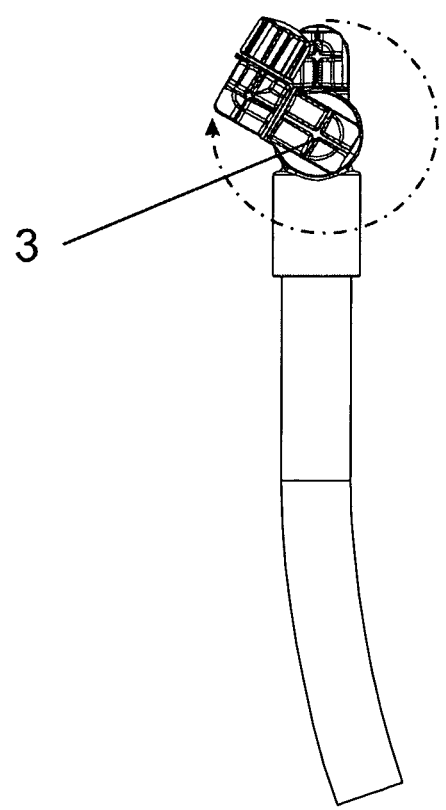
FIG. 6 is a lateral diagram demonstrating the drizzle type spray apparatus of the present invention during its operation.

A combined first adjustable unit 3a and second adjustable unit 3b is shown in FIG. 4. The first shaft portion 33 of the first adjustable unit 3a is a conical entity having a wedge 331 around its circumference, and end of the threading portion 34 shapes into a first expansion portion 321. The first shaft receiving portion 32 of the second adjustable unit 3b is equipped with a wedge bar 321 across its inside diameter and a spacer 322. After the conical body of the first shaft portion 33 is inserted smoothly into the first shaft receiving portion 32, the wedge 331 operates to hinge on the wedge bar 321, whereas the first expanding portion 341 operates to press onto the spacer 322 to establish a blocking position;

The second shaft portion 31 of the second adjustable unit 3b is a conical entity having a wedge 331 around its circumference, an end of the second shaft portion has a second expanding portion 312. A joiner 222 and a wedge bar 321 are disposed on the inner diameter of the second shaft receiving portions 221a, 221b of the connecting member 2. After the conical body of the second shaft portion 31 is inserted smoothly into the second shaft receiving portions 221a, 221b, the wedge 311 operates to hinge on the wedge bar 223, whereas the second expanding portion 312 works to press onto the second shaft receiving portions to establish a blocking position;

The sprinkle head 35 is generally set out to have a substantially cylindrical outer surface, comprising a first reservoir 251, a second reservoir 352, and slotted plate 37 plug 38 appropriate for insertion into the reservoir. The aperture located at the center of the outer surface of the sprinkle head is a nozzle 353, which are used for locking the protruded portion 371 of the slotted plate 37. A second reservoir 352 is installed at the bottom part of the first reservoir 351. The first reservoir 351 has an inner threading, and the second reservoir 352 has an inner pressing surface, for which an aperture passing through the sprinkle head 35 of the inner pressing surface is a nozzle 353;

The plug 38 has a first section and a second section, the diameter of the first section is larger than that of the second section, the cylindrical part of the first section extends to reach the second section, a water inlet channel 381 is disposed on the first section that is close to the second section. There is at least one water inlet channel 381, and is evenly distributed in a circling fashion, the second section has more than one water outlet channel 382. In the current embodiment, two channels are set out to pass by each other, and the distal end surface extending to the second section is bent to form two staggered lateral channels 382a 382b, the lateral channels 382a, 382b, the terminal ends of the lateral channels 382a, 382b stop at the outer diameter of the recess of the slotted plate 37, the width of the water channel of the water outlet channel 382 is smaller than the water inlet channel, so that the decrease in space can make the water flow entering into the reservoir turn from large to small in such a way to create high water pressure. Whereby, water flow passes through the hole 372 of the slotted plate 37 before passing though the nozzle 353 to instantly release water pressure, so as to finally create drizzle type water splash;

The slotted plate 37 is a circular plate, which has on an edge a protruded portion, the protruded portion 371 is a circular protrusion, the maximum outer diameter of the protruded portion 371 is larger than the aperture width of the nozzle 353, the circular outer diameter of the highest point of the protruded portion 371 is smaller than the aperture of the nozzle 353 for pressing against the aperture edge of the nozzle 353, an opposite back surface of the protruded portion 371 is a recess, a center of the recess 371 is a fine-sized hole 372, the outer diameter of the slotted plate 37 is minorly smaller than the inner diameter of the second reservoir 352, which is configured to allow the slotted plate 37 to press on the inner top surface before letting the plug 38 to hold after the slotted plate 37 is placed inside the second reservoir 352. The fine-sized hole 372 works to make water passing therefrom form into drizzle type water splash, the distal end of the first section of the plug 38 presses on the flanged portion 343 of the inner diameter of the threaded portion 34 of the first adjustable unit 3a, so as to stabilize the plug 38 to prevent it from detachment from the first reservoir 351;

By the above disclosure of the units and parts, the adjustment movement thereof can be realized as shown in FIG. 5 and FIG. 6. The first adjustable unit 3a can move in a radial direction that is relative to the second adjustable unit 3b, the second adjustable unit 3b can move in a radial direction that is relative to the connecting member, also, multiple angle spray direction is possible with the relative disposition of the sprinkle head of the first adjustable unit 3a.

The adjustable member 3 of the current invention is not particularly limited to the drawings for the current invention's embodiments, ball valves can be used as the adjustable unit, or the connecting member 2 and the second adjustable unit 3b can be combined into a single body part, and the first receiving portion 21 of the connecting member 2 is an adjustable shaft receiving pipe, the adjustable unit can be one or more than one in terms of quantity.

The adjustable member 3 of the embodiments of the current invention can be of two sets, this means that the first adjustable unit 3a and the second adjustable unit 3b are also two sets, each is connected to the second shaft receiving portions 221a, 221b of the second receiving portion 22 of the connecting member 2.

What is claimed is:

1. A drizzle type spray apparatus for connecting with a tube of a sprinkle spray apparatus, comprising an adjustable member, which has a sprinkle head, wherein the sprinkle head works to eject water, and is a means for changing a sprinkle direction of the sprinkle head, wherein the sprinkle head comprises a plug, a slotted plate, a reservoir which has first reservoir and a second reservoir, and a nozzle, wherein the slotted plate is disposed inside the second reservoir, wherein the plug has a water inlet channel and a water outlet channel, and an end of the water outlet channel is set up to push against the slotted plate and uphold a bottom edge of the second reservoir, such that the sprinkle head is able to provide a drizzle type of spray after water flows from the tube to the plug.

2. The drizzle type spray apparatus according to claim 1, wherein the slotted plate has a protruded portion at a center of the slotted plate, wherein the protruded portion has a hole at a center of the protruded portion and the protruded portion is able to rest onto a periphery of an aperture of the nozzle.

3. The drizzle type spray apparatus according to claim 1, wherein the width of an aperture of the first reservoir is larger than the width of an aperture of the second reservoir, and the second reservoir is located in a bottom end of the first reservoir.

4. The drizzle type spray apparatus according to claim 3, wherein an inside surface of the aperture of the first reservoir has a screw thread adapted for connecting to a first adjustable unit.

5. A drizzle type spray apparatus for connecting with a tube of a sprinkle spray apparatus, comprising an adjustable member and a sprinkle head, wherein the sprinkle head is for ejecting water, and the adjustable member is a means for changing a sprinkle direction of the sprinkle head, wherein the adjustable member comprises: a first adjustable unit and a second adjustable unit, wherein each of the first and second adjustable units is an angled tube, wherein an external surface of an end of the first adjustable unit is disposed with a screw thread which is coupled to the sprinkle head, and another end of the first adjustable unit is disposed with a first shaft portion, wherein the second adjustable unit is disposed with a first shaft receiving portion and a second shaft portion, wherein the second shaft portion of the second adjustable unit is arranged for coupling with a connecting member which is connected to the tube in such a manner that the second adjustable unit is capable of rotating in a radial direction relative to the connecting member, wherein the first shaft portion of the first adjustable unit is coupled to the first shaft receiving portion in such a manner that the first adjustable unit is capable of rotating in a radial direction relative to the second adjustable unit.

6. The drizzle type spray apparatus according to claim 5, wherein a second end of the tube is connected to the connecting member which comprises a first receiving portion and a second receiving portion, wherein the first receiving portion is coupled to a second end opening of the tube, wherein the second receiving portion has a second shaft receiving portions which works to receive the second shaft portion of the second adjustable unit.

7. The drizzle type spray apparatus according to claim 6, wherein the second receiving portion of the connecting member has two or more of said second shaft receiving portions, wherein the drizzle spray apparatus comprises two or more of said adjustable member.

8. The drizzle type spray apparatus according to claim 7, wherein the second receiving portion of the connecting member has two said second shaft receiving portions which are mutually symmetrical to each other, wherein each of the two said second shaft receiving portions is provided for receiving each of the second shaft portions of the second adjustable units of the two said adjustable members.

9. The drizzle type spray apparatus according to claim 5, wherein the sprinkle head comprises a plug, a slotted plate, a reservoir which has a second reservoir, and a nozzle, wherein the slotted plate is disposed inside the second reservoir, wherein the plug has a water inlet channel and a water outlet channel, and an end of the water outlet channel is set up to push against the slotted plate and uphold a bottom edge of the second reservoir, such that the sprinkle head is able to provide a drizzle type of spray after water flows from the tube to the plug.

10. The drizzle type spray apparatus according to claim 9, wherein the slotted plate has a protruded portion at a center of the slotted plate, wherein the protruded portion has a hole at a center of the protruded portion and the protruded portion can rest onto a periphery of an aperture of the nozzle.

11. The drizzle type spray apparatus according to claim 5, wherein the reservoir further has a first reservoir, wherein the width of an aperture of the first reservoir is larger than the width of an aperture of the second reservoir, and the second reservoir is located in a bottom end of the first reservoir.

12. The drizzle type spray apparatus according to claim 11, wherein an inside surface of the aperture of the first reservoir has a screw thread adapted for connecting to the first adjustable unit.

* * * * *